United States Patent
Kumar (10) Patent No.: US 10,242,137 B2
(45) Date of Patent: Mar. 26, 2019

(54) METHODS AND SYSTEMS FOR MANAGING MEMORY BLOCKS OF SEMICONDUCTOR DEVICES IN EMBEDDED SYSTEMS

(71) Applicant: Wipro Limited, Bangalore (IN)

(72) Inventor: Kodavalla Vijay Kumar, Bangalore (IN)

(73) Assignee: Wipro Limited, Bangalore (IN)

( * ) Notice: Subject to any disclaimer, the term of this patent is extended or adjusted under 35 U.S.C. 154(b) by 95 days.

(21) Appl. No.: 15/276,434

(22) Filed: Sep. 26, 2016

(65) Prior Publication Data

US 2018/0039716 A1 Feb. 8, 2018

(30) Foreign Application Priority Data

Aug. 3, 2016 (IN) .............................. 201641026542

(51) Int. Cl.
*G06F 17/50* (2006.01)

(52) U.S. Cl.
CPC ........ *G06F 17/505* (2013.01); *G06F 17/5054* (2013.01); *G06F 17/5072* (2013.01); *G06F 17/5081* (2013.01); *G06F 2217/84* (2013.01)

(58) Field of Classification Search
CPC ............... G06F 17/505; G06F 17/5054; G06F 17/5072; G06F 17/5081
See application file for complete search history.

(56) References Cited

U.S. PATENT DOCUMENTS

2012/0127818 A1* 5/2012 Levy ........................ G06F 13/16
365/230.03

OTHER PUBLICATIONS

"7 Series FPGAs Memory Resources", User Guide, Nov. 12, 2014, pp. 1-86, v 1.11, Xilinx, Inc., Retrieved from: http://www.xilinx.com/support/documentation/user_guides/ug473_7Series_Memory_Resources.pdf.

"Embedded Memory (RAM: 1-PORT, RAM: 2-PORT, ROM: 1-PORT, and ROM: 2-PORT)", User Guide, May 2, 2016, pp. 1-61, Altera Corporation, Retrieved from: https://www.altera.com/content/dam/altera-www/global/en_US/pdfs/literature/ug/ug_ram_rom.pdf.

* cited by examiner

*Primary Examiner* — Vuthe Siek
(74) *Attorney, Agent, or Firm* — LeClairRyan PLLC (57) ABSTRACT

A method of mapping target design memory blocks to embedded memory blocks in a semiconductor device of an embedded system is disclosed. The method includes categorizing a plurality target design memory blocks based on memory operation patterns into one of an overlapping category and a non-overlapping category; identifying a set of target design memory blocks that satisfy capacity criteria of a single embedded memory block in the semiconductor device, each target design memory block in the set is identified from either the overlapping category or the non-overlapping category; designing semiconductor device components to be created on the semiconductor device based on one of the overlapping category and the non-overlapping category, which the set of target design memory blocks is associated with; implementing the set of target design memory blocks and the semiconductor device components onto the single embedded memory block of the semiconductor device.

19 Claims, 8 Drawing Sheets

METHODS AND SYSTEMS FOR MANAGING MEMORY BLOCKS OF SEMICONDUCTOR DEVICES IN EMBEDDED SYSTEMS

This application claims the benefit of Indian Patent Application Serial No. 201641026542 filed Aug. 3, 2016, which is hereby incorporated by reference in its entirety.

FIELD

This disclosure relates generally to embedded systems and more particularly to methods and systems for managing memory blocks of semiconductor devices in embedded systems.

BACKGROUND

The number of memory blocks in a semiconductor device in an embedded system are limited and each of these memory blocks have fixed size. Due to this constraint, only some limited combinations of width and depth configurations for target design memory blocks can be implemented to the memory blocks in the embedded system. The implementation is typically performed automatically by using Electronic Design Automation (EDA) tools.

Conventional EDA tools can directly map a target design memory to an embedded memory block automatically with one-to-one correspondence. These conventional tools may be able to implement multiple small target design memory blocks to a single embedded memory block only when the combined width of the multiple small target design memory blocks is less than or equal to the width of the single embedded memory block. However, the conventional EDA tools are oblivious to the multiple small target design memory blocks being overlapping or non-overlapping.

These shortcomings in the conventional EDA tools require larger number of embedded memory blocks in a semiconductor device. This further leads to necessity of more expensive semiconductor devices that have more number of memory blocks. Moreover, usage of more number of memory blocks may lead to routing congestion and reduced timing performance and may thus demand larger size of the semiconductor device and more power consumption.

SUMMARY

In one embodiment, method of mapping target design memory blocks to embedded memory blocks in a semiconductor device of an embedded system is disclosed. The method includes categorizing, via an Electronic Design Automation (EDA) tool, a plurality target design memory blocks based on memory operation patterns into one of an overlapping category and a non-overlapping category, the overlapping category comprising target design memory blocks having overlapping memory operations and the non-overlapping category comprising target design memory blocks having non-overlapping memory operation; identifying, via the EDA tool, a set of target design memory blocks from the plurality of target design memory blocks that satisfy capacity criteria of a single embedded memory block in the semiconductor device, wherein each target design memory block in the set is identified from the same category selected from one of the overlapping category and the non-overlapping category; designing, via the EDA tool, semiconductor device components to be created on the semiconductor device based on one of the overlapping category and the non-overlapping category, which the set of target design memory blocks is associated with; implementing, via the EDA tool, the set of target design memory blocks and the semiconductor device components onto the single embedded memory block of the semiconductor device.

In another embodiment, a system of mapping target design memory blocks to embedded memory blocks in a semiconductor device of an embedded system is disclosed. The system includes at least one processors and a computer-readable medium. The computer-readable medium stores instructions that, when executed by the at least one processor, cause the at least one processor to perform operations that include categorizing a plurality target design memory blocks based on memory operation patterns into one of an overlapping category and a non-overlapping category, the overlapping category comprising target design memory blocks having overlapping memory operations and the non-overlapping category comprising target design memory blocks having non-overlapping memory operation; identifying a set of target design memory blocks from the plurality of target design memory blocks that satisfy capacity criteria of a single embedded memory block in the semiconductor device, wherein each target design memory block in the set is identified from the same category selected from one of the overlapping category and the non-overlapping category; designing semiconductor device components to be created on the semiconductor device based on one of the overlapping category and the non-overlapping category, which the set of target design memory blocks is associated with; implementing the set of target design memory blocks and the semiconductor device components onto the single embedded memory block of the semiconductor device.

In yet another embodiment, a non-transitory computer-readable storage medium for mapping target design memory blocks to embedded memory blocks in a semiconductor device of an embedded system is disclosed, which when executed by a computing device, cause the computing device to: categorizing, via an EDA tool, a plurality target design memory blocks based on memory operation patterns into one of an overlapping category and a non-overlapping category, the overlapping category comprising target design memory blocks having overlapping memory operations and the non-overlapping category comprising target design memory blocks having non-overlapping memory operation; identifying, via the EDA tool, a set of target design memory blocks from the plurality of target design memory blocks that satisfy capacity criteria of a single embedded memory block in the semiconductor device, wherein each target design memory block in the set is identified from the same category selected from one of the overlapping category and the non-overlapping category; designing, via the EDA tool, semiconductor device components to be created on the semiconductor device based on one of the overlapping category and the non-overlapping category, which the set of target design memory blocks is associated with; implementing, via the EDA tool, the set of target design memory blocks and the semiconductor device components onto the single embedded memory block of the semiconductor device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Additional illustrative embodiments are listed below. In one embodiment, a block diagram of an exemplary computer system for implementing various embodiments is disclosed in FIG. 1. Computer system 102 may comprise a central processing unit ("CPU" or "processor") 104. Processor 104 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Figure 1:
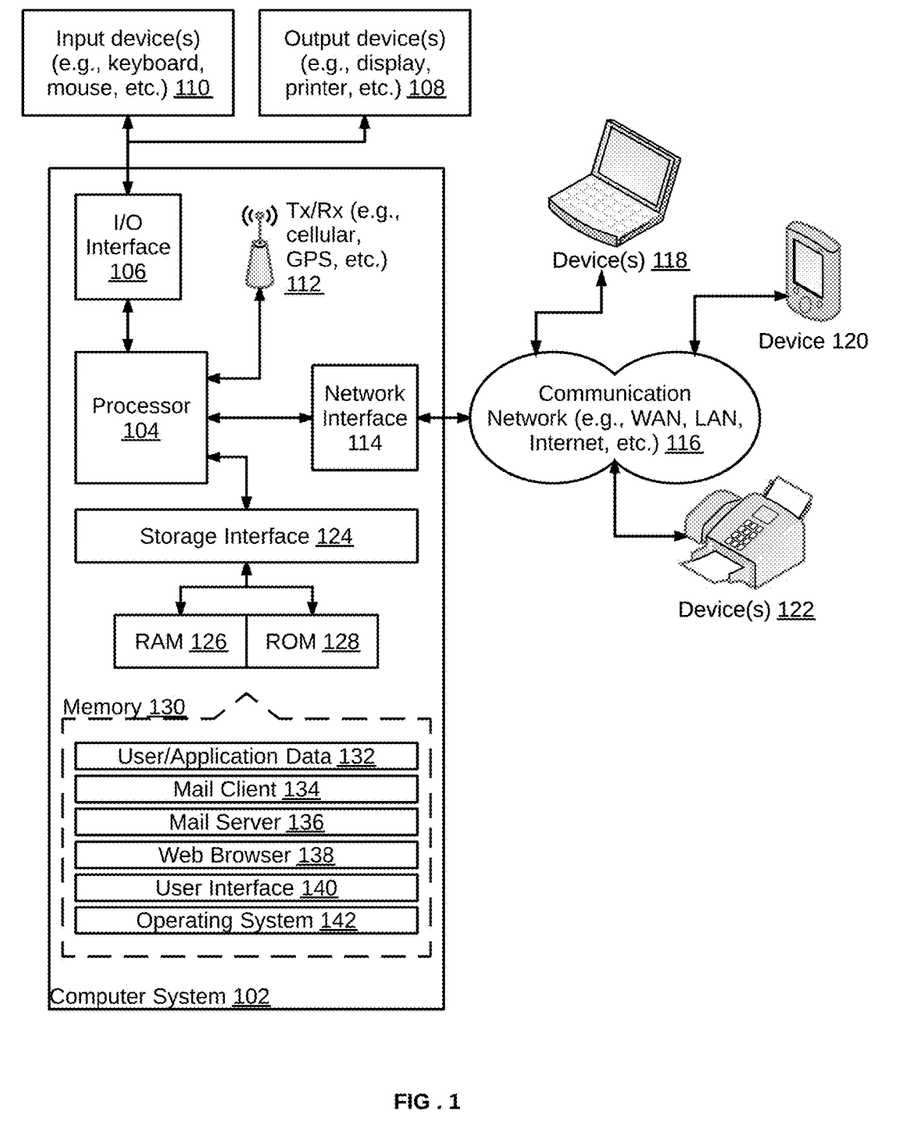
FIG. 1 illustrates a block diagram of an exemplary computer system for implementing various embodiments.

Processor 104 may be disposed in communication with one or more input/output (I/O) devices via an I/O interface 106. I/O interface 106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 106, computer system 102 may communicate with one or more I/O devices. For example, an input device 108 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 110 may be a printer, fax machine, video display (e.g., cathode ray tube (CRT), liquid crystal display (LCD), light-emitting diode (LED), plasma, or the like), audio speaker, etc. In some embodiments, a transceiver 112 may be disposed in connection with processor 104. Transceiver 112 may facilitate various types of wireless transmission or reception. For example, transceiver 112 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 104 may be disposed in communication with a communication network 114 via a network interface 116. Network interface 116 may communicate with communication network 114. Network interface 116 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 114 may include, without limitation, a direct interconnection, local area network (LAN), wide area network (WAN), wireless network (e.g., using Wireless Application Protocol), the Internet, etc. Using network interface 116 and communication network 114, computer system 102 may communicate with devices 118, 120, and 122. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 102 may itself embody one or more of these devices.

In some embodiments, processor 104 may be disposed in communication with one or more memory devices (e.g., RAM 126, ROM 128, etc.) via a storage interface 124. Storage interface 124 may connect to memory devices 130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 130 may store a collection of program or database components, including, without limitation, an operating system 132, a user interface application 134, a web browser 136, a mail server 138, a mail client 140, a user/application data 142 (e.g., any data variables or data records discussed in this disclosure), etc. Operating system 132 may facilitate resource management and operation of the computer system 102. Examples of operating system 132 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 134 may facilitate display, execution, interaction, manipulation, or operation of program components through textual or graphical facilities. For example, user interfaces may provide computer interaction interface elements on a display system operatively connected to computer system 102, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 102 may implement web browser 136 stored program component. Web browser 136 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 102 may implement mail server 138 stored program component. Mail server 138 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 102 may implement mail client 140 stored program component. Mail client 140 may be a mail viewing application, such as Apple Mail, Microsoft Entourage, Microsoft Outlook, Mozilla Thunderbird, etc.

In some embodiments, computer system 102 may store user/application data 142, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Figure 2:
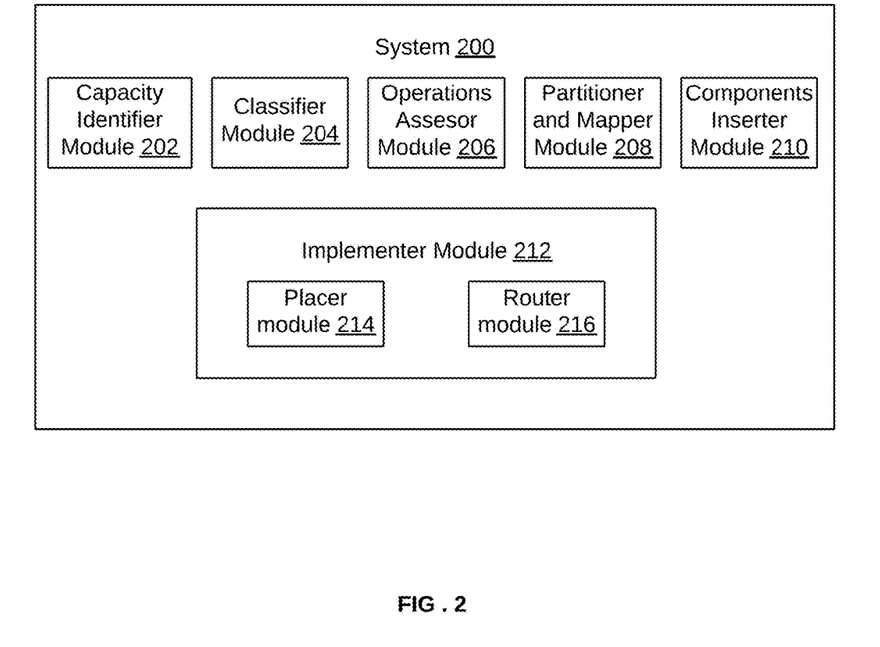
FIG. 2 is a block diagram illustrating a system for mapping target design memory blocks to embedded memory blocks in a semiconductor device of an embedded system, in accordance with an embodiment.

FIG. 2 is a block diagram illustrating a system 200 for mapping target design memory blocks to embedded memory blocks in a semiconductor device of an embedded system, in accordance with an embodiment. Examples of the semiconductor device may include, but are not limited to Field Programmable Gate Array (FPGA), Application Specific Integrated Circuit (ASIC), Application Specific Standard Part (ASSP), System on Chip (SoC), and System on Programmable Chip (SoPC).

System 200 may be an Electronic Design Automation (EDA) system. System 200 include a capacity identifier module 202, a classifier module 204, an operations assessor module 206, a partitioner and mapper module 208, a components inserter module 210, and an implementer module 212.

Capacity identifier module 202 identifies capacity requirement, i.e., width and depth requirement, for each target design memory block in a plurality of target design memory blocks that are to be implemented to embedded memory blocks. Additionally, capacity identifier module 202 identifies width and depth associated with each of the embedded memory blocks. This information is then used by classifier module 204 to classify the plurality of target design memory blocks based on its capacity requirements and the embedded memory blocks based on associated capacities. This is further explained in conjunction with FIG. 3.

Operations assessor module 206 then categorizes the plurality target design memory blocks based on memory operation patterns into one of an overlapping category and a non-overlapping category. The memory operations include write and read operations, which may be determined using write and read clocks of the plurality of target design memory blocks. The overlapping category includes target design memory blocks that have overlapping memory operations and the non-overlapping category includes target design memory blocks that have non-overlapping memory operations. This is further explained in detail in conjunction with FIG. 3.

Thereafter, partitioner and mapper module 208 identifies a set of target design memory blocks from the plurality of target design memory blocks that satisfy capacity criteria of a single embedded memory block in the semiconductor device. Each target design memory block in the set is identified from either the overlapping category or the non-overlapping category. Partitioner and mapper module 208 also logically partitions each of the embedded memory blocks based on an associated set of target design memory blocks. This is further explained in conjunction with FIG. 3.

To enable and support the mapping, components inserter module 210 determines semiconductor device components that need to be designed and implemented on the semiconductor device. The semiconductor device components may be determined based on whether the set of target design memory blocks belong to the overlapping category or the non-overlapping category. This is further explained in detail in conjunction with FIG. 3.

Thereafter, implementer module 212 implements the set of target design memory blocks and the semiconductor device components onto the single embedded memory block of the semiconductor device. Implementer module 212 includes a placer module 214 that assigns the set of target design memory blocks to the single embedded memory block along with the semiconductor device components. Implementer module 212 further includes a router module 216 that performs routing in the semiconductor to accommodate the placed set of target design memory blocks and the placed semiconductor device components. This is further explained in detail in conjunction with FIG. 3.

Figure 3:
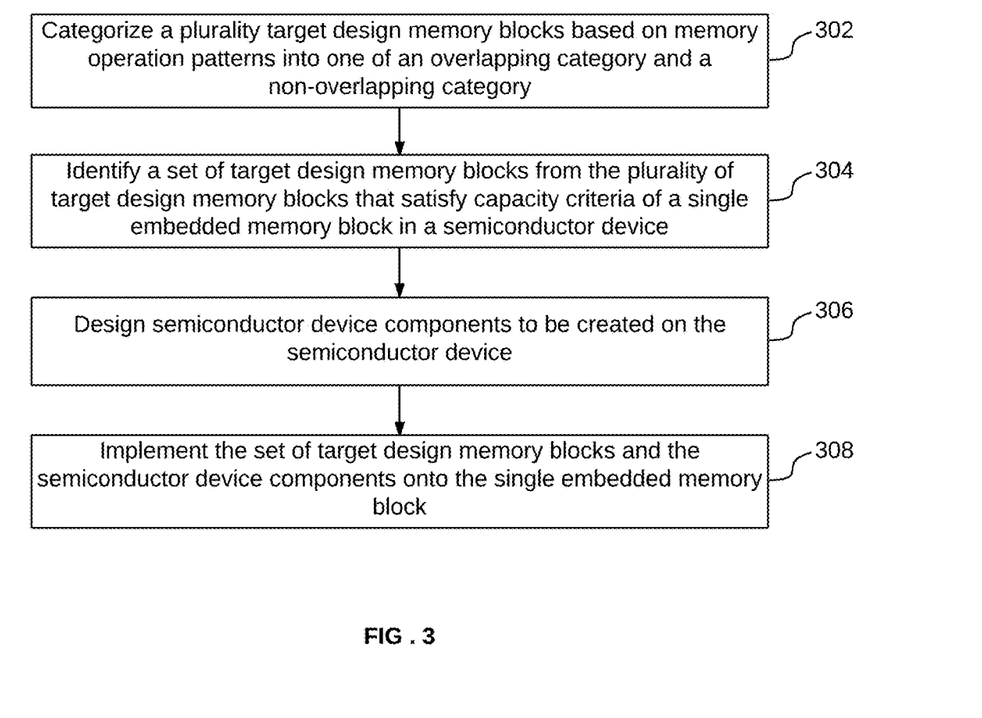
FIG. 3 illustrates a flowchart of a method for mapping target design memory blocks to embedded memory blocks in a semiconductor device of an embedded system, in accordance with an embodiment.

FIG. 3 illustrates a flowchart mapping target design memory blocks to embedded memory blocks in a semiconductor device of an embedded system, in accordance with an embodiment. Examples of the semiconductor device may include, but are not limited to FPGA, ASIC, ASSP, SoC, and SoPC.

In order to map two or more target design memory blocks to a single embedded memory block in the semiconductor device of an embedded system, a plurality of target design memory blocks are classified based on capacity requirements. Capacity requirements for a target design memory block includes depth and width requirement of the target design memory block. The classification of the plurality of target design memory blocks may be carried out independent of the read and write clocks of each target design memory block. In other words, the read and write clocks of target design memory blocks post classification in a particular group may be different.

Similarly, a plurality of embedded memory blocks in the semiconductor device are also classified based on associated capacities. Capacity of an embedded memory block is defined by width and depth of the embedded memory block. The plurality of target design memory blocks and the plurality of embedded memory blocks are classified in order to determine, which and how many target design memory blocks can be mapped to a given embedded memory block in the semiconductor device. In an embodiment, once the plurality of embedded memory blocks in a semiconductor device have been classified as described above, such classification may be stored and associated with a given semiconductor device for future use by the EDA tool. This would enable faster availability of such classification data.

Thereafter, in response to performing the classification, the plurality of target design memory blocks are categorized, at 302, into an overlapping category or a non-overlapping category, based on memory operation patterns of each target design memory block. Memory operation patterns include read and write operations. The overlapping category includes those target design memory blocks that have overlapping memory operations. In other words, for each of these target design memory blocks the read and write operations occur at the same time instant or they have same read/write control signals. Thus, write clocks of all target design memory blocks in the overlapping category are same and read clocks of all target design memory blocks in the overlapping category are also same.

Similarly, the non-overlapping category includes those target design memory blocks that have non-overlapping memory operations. In other words, for each of these target design memory blocks the read and write operations occur at different time instants or they have different read/write control signals. Thus, write clocks and read clocks of various target design memory blocks in the non-overlapping group may be different. The categorization may be performed using an EDA tool.

At 304, a set of target design memory blocks are identified from the plurality of target design memory blocks. The identification may be performed by the EDA tool. The set of target design memory blocks are identified such that they satisfy capacity criteria of a single embedded memory block in the semiconductor device. One of the capacity criteria is that the combined width of memory blocks in the set of target design memory blocks should be less than or equal to width of the single embedded memory block. Additionally, another capacity criterion is that the combined depth of the memory blocks in the set of target design memory blocks should be less than or equal to depth of the single embedded memory block. Only when both these criteria have been satisfied, the set of target design memory blocks are identified to be mapped to the single embedded memory block in the semiconductor device. These criteria may be represented using the equations 1 and 2 given below for two target design memory blocks being mapped to an embedded memory block:

$$\text{Depth(First target design memory block+Second target design memory block)} < \text{Depth(Embedded memory block)} \quad (1)$$

$$\text{Width(First target design memory block+Second target design memory block)} < \text{Width(Embedded memory block)} \quad (2)$$

The step of identifying such sets of target design memory blocks is carried out for all such embedded memory blocks in the semiconductor device and their corresponding set of target design memory blocks are identified. This is repeated until each target design memory block has been identified to be mapped to an embedded memory block in the semiconductor device.

Further, each of the set of target design memory blocks is identified from the same category, i.e., either the overlapping category or the non-overlapping category. In other words, the set of target design memory blocks will belong to either the overlapping category or the non-overlapping category. In the overlapping category, every target design memory block has the same clock for write memory operations and the same clock for read memory operations.

After identifying the set of target design memory blocks, semiconductor device components to be created on the semiconductor device are designed at 306. The EDA tool may design these components. The semiconductor device components may include, but are not limited to multiplexer, de-multiplexer, sequential elements, and combinatorial gates. The semiconductor device components are designed based on whether the set of target design memory blocks is associated with the overlapping category or the non-overlapping category. As a result, number of semiconductor device components and their placement would also depend on the category with which the set of target design memory blocks is associated. This is further explained in detail with exemplary embodiments given in FIG. 4 that corresponds to the scenario of non-overlapping category and FIG. 5 that corresponds to the scenario of overlapping category.

At 308, the set of target design memory blocks and the semiconductor device components are implemented onto the single embedded memory block of the semiconductor device. To this end, the set of target design memory blocks and the semiconductor device components are firstly placed on the single embedded memory block. Thereafter, routing is performed in the semiconductor device, such that routing accommodate the placed set of target design memory blocks and the placed semiconductor device components. In other words, when routing is performed, it also takes into consideration the new or additional semiconductor device components that would be added to implement multiple target design memory blocks to a single embedded memory block. As a result of taking the new or additional semiconductor device components into consider, routing constraints may be reduced that might have occurred, had these additional components not been considered. The implementation may be performed by the EDA tool.

Multiple small target design memory blocks are implemented onto a single embedded memory block irrespective of the target design memory blocks having overlapping or non-overlapping memory access patterns. As a result, there is an optimal realization of target design memory blocks to minimal number of embedded memory blocks. This ensures that the number of embedded memory blocks needed in a semiconductor device is minimal for a specified number of target design memory blocks, thereby, minimizing the cost of the semiconductor device. This further leads to less routing congestion and improved timing performance as less number of embedded memory blocks are used in the semiconductor device.

Figure 4:
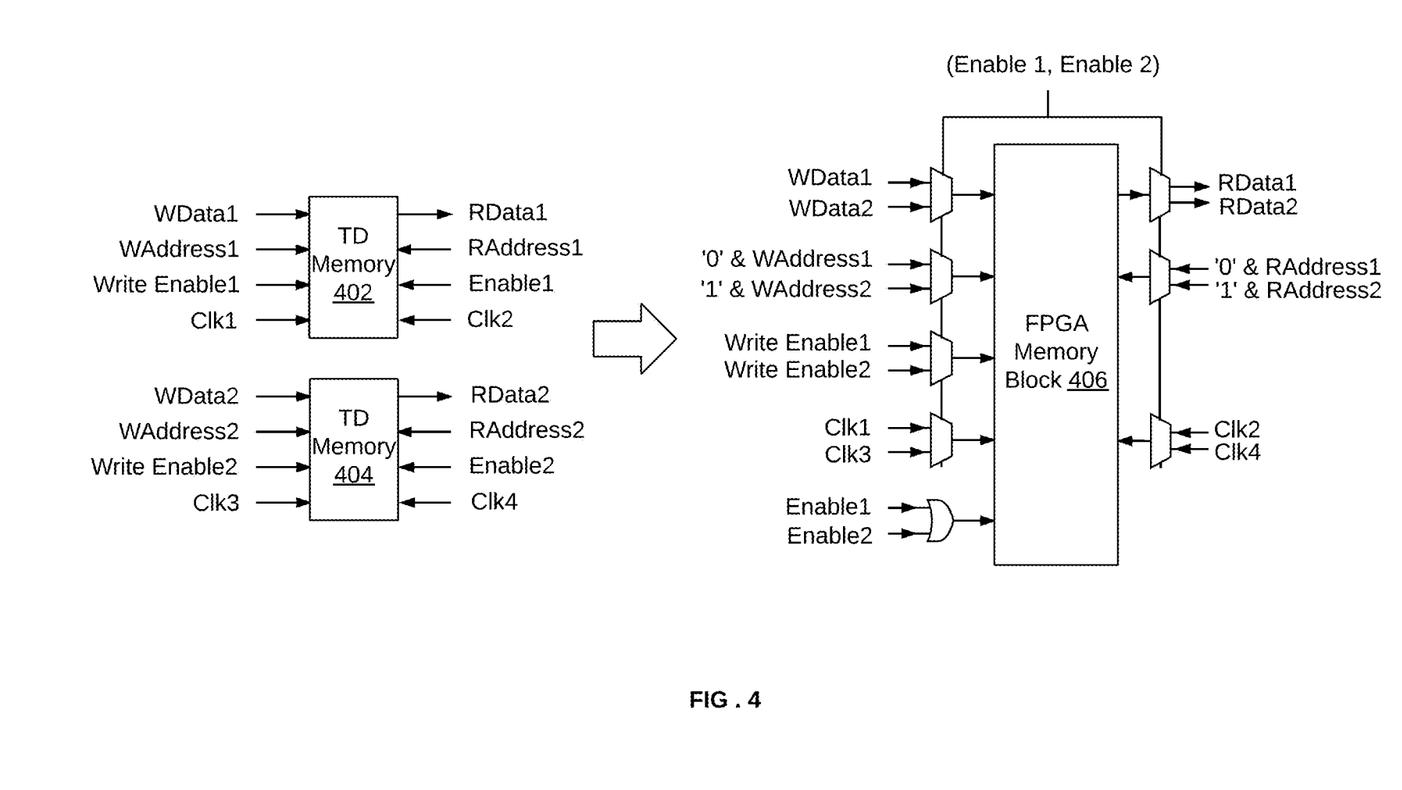
FIG. 4 illustrates a method of implementing two target design memory blocks having non-overlapping memory operations to a single FPGA memory block using semiconductor device components, in accordance with an exemplary embodiment.

FIG. 4 illustrates implementation of two target design memory blocks having non-overlapping memory operations to a single FPGA memory block using semiconductor device components, in accordance with an exemplary embodiment. In this exemplary embodiment, a target design memory block 402 and a target design memory block 404 that are selected from the non-overlapping category are implemented to a single FPGA memory block 406. As target design memory blocks 402 and 404 are selected from the non-overlapping category, their read/write accesses do not overlap.

Target design memory block 402 has signals associated with it, which include write data (WData1), write address (WAddress1), read or write (Write enable1), write clock (Clk1), read data (RData1), read address (RAddress1), memory enable (Enable 1), and read clock (Clk2). In a similar manner and in the same order, target design memory block 404 has following signal associated with it: WData2, WAddress2, Write enable2, write clock (Clk3), RData2, RAddress2, Enable 2, and read clock (Clk4). The write and read clocks of target design memory block 402, i.e., Clk1 and Clk2, and that for target design memory block 404, i.e., Clk3 and Clk4, may be different in terms of their frequencies and/or phase.

In order to map target design memory block 402 and target design memory block 404 to FPGA memory block 406, new semiconductor device components are also implemented around FPGA memory block 406. These components include six muxs, one demux, and one 'OR' logic. As a result of the use of the muxs and the demux, the single FPGA memory block 406 can be used to map both target design memory blocks 402 and 404. However, to enable this, the OR logic is used to connect enable1 and enable2 to FPGA memory block 406. Additionally, WAddress1 is appended with '0' as Most Significant Bit (MSB) and WAddress2 is appended with '1' as MSB bit. As a result, upper half of FPGA memory block 406 is allocated to target design memory block 402 and lower half of FPGA memory block 406 is allocated to target design memory block 404. Alternatively, WAddress1 is appended with '0' as the Least Significant Bit (LSB) and WAddress2 is appended with '1' as LSB bit. As a result, alternate memory locations in FPGA memory block 406 may be allocated to target design memory block 402 and target design memory block 404. It will be apparent to a person skilled in the art that any such combination of memory blocks in FPGA memory block 406 is envisioned by the current application.

Further, the select line for the muxs and the demux is derived from a combination of enable1 and enable2 signals as shown in FIG. 4. When, enable1=1 and enable2=0, first input of the muxs and first output of the demux are selected. Thus, when this condition is satisfied, the following signals would be active: Wdata1, WAddress1, Write Enable1, RData1, RAddress1, Clk1, and Clk2. Similarly, when, enable1=0 and enable2=1, second input of the muxs and second output of the demux are selected. Thus, when this condition is satisfied, the following signals would be active: Wdata2, WAddress2, Write Enable2, RData2, RAddress2, Clk3, and Clk4. As a result, by using additional semiconductor device components (six muxs, one demux, and OR logic), two target design memory blocks are implemented to a single FPGA memory block 406. It will be apparent to a person skilled in the art that the embodiment is not limited to implementation of only two target design memory blocks to a single embedded memory block.

It will be apparent to a person skilled in the at that though the exemplary embodiment uses 2 port memory blocks of an FPGA, the invention is not limited to the same and encompasses other memory types including single port memory blocks and true dual port memory blocks.

Figure 5:
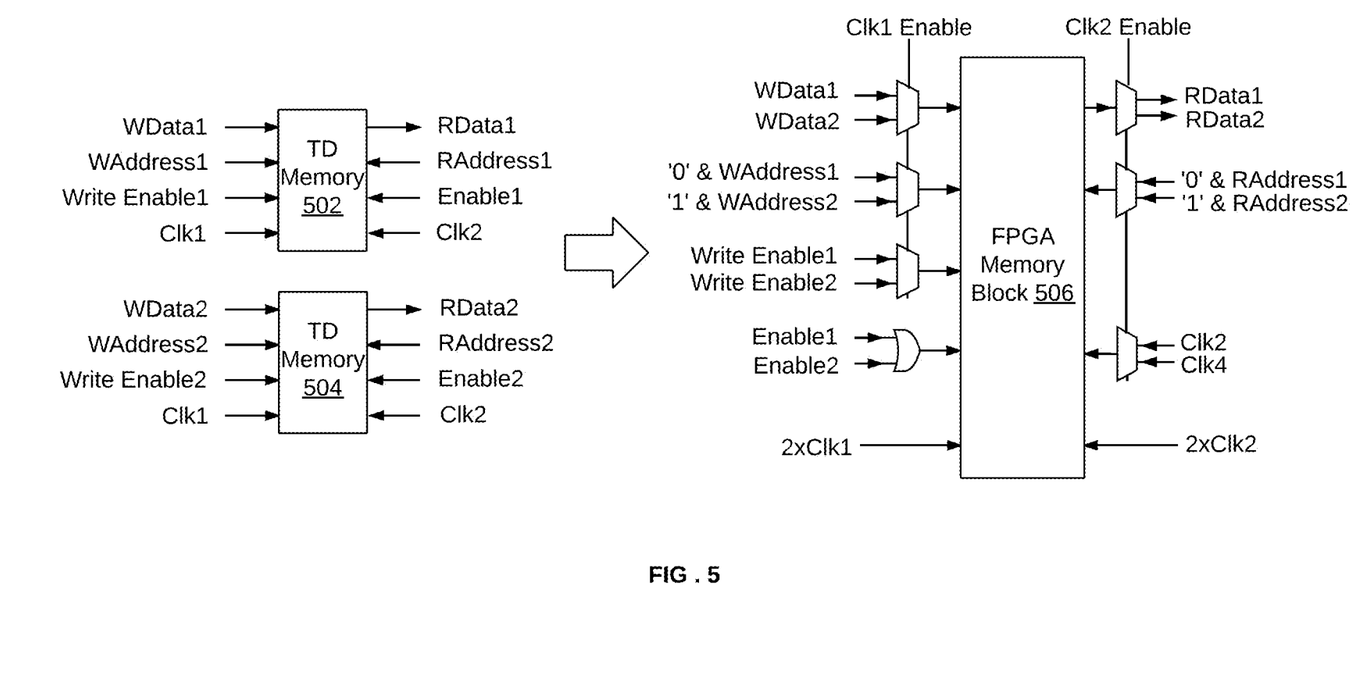
FIG. 5 illustrates a method of implementing two target design memory blocks having overlapping memory operations to a single embedded memory block using semiconductor device components, in accordance with an exemplary embodiment.

FIG. 5 illustrates a method of implementing two target design memory blocks having overlapping memory operations to a single embedded memory block using semiconductor device components, in accordance with an exemplary embodiment. In this exemplary embodiment, a target design memory block 502 and a target design memory block 504 that are selected from the overlapping category are implemented to a single FPGA memory block 506. As target design memory blocks 502 and 504 are selected from the overlapping category, they have overlapping read/write accesses.

Target design memory block 502 has signals associated with it, which include WData1, WAddress1, Write enable1, write clock (Clk1), RData1, RAddress1, enable 1, and read clock (Clk2). In a similar manner and in the same order, target design memory block 504 has following signal associated with it: WData2, WAddress2, Write enable2, write clock (Clk1), RData2, RAddress2, Enable 2, and read clock (Clk2).

Due to overlapping read/write patterns, the write clocks of target design memory blocks 502 and 504 are same, i.e., Clk1. Similarly, read clocks for these memory blocks are also same, i.e., Clk2.

In order to map target design memory block 502 and target design memory block 504 to FPGA memory block 506, new semiconductor device components are also implemented around FPGA memory block 506. These components include five muxs, one demux, and one 'OR' logic. As a result of the use of the muxs and the demux, the single FPGA memory block 506 can be used to map both target design memory blocks 502 and 504.

The write clock of FPGA memory block 506 operates at double the clock frequency of the write clock of target design memory blocks 502 and 504, i.e., 2×Clk1. The write clock (2×Clk1) of FPGA memory block 506 is edge aligned with the write clock (Clk1) of target design memory blocks 502 and 504. Similarly, the read clock of FPGA memory block 506 operates at double the clock frequency of the read clock of target design memory blocks 502 and 504, i.e., 2×Clk2. The read clock (2×Clk2) of FPGA memory block 506 is edge aligned with the read clock (Clk2) of target design memory blocks 502 and 504. Doubling of the clock frequencies enables performing of the write and read memory operations for each of target design memory blocks 502 and 504 simultaneously on FPGA memory block 506. It will be apparent to a person skilled in the art that the invention is not limited to mapping only two target design memory blocks to a single FPGA memory block and that the frequency of write and read clocks for the FPGA memory block would depend on the number of target design memory blocks being mapped. For example, if three target design memory blocks from the overlapping category are being mapped to a single FPGA memory block, the write and read clocks of the FPGA memory blocks would operate at thrice the frequency of the three target design memory blocks.

To enable the mapping, the OR logic is used to connect enable1 and enable2 to FPGA memory block 506. The select lines for the muxs and the demux are derived from Clk1 enable signal and Clk2 enable signal. These signals have the same frequency as that of Clk1 and Clk2 and their edges align with respective clocks. The muxs for WData, WAddress, and Write Enable are controlled by Clk1 enable signal. When, Clk1 enable=0, first input of muxs is selected and when Clk1 enable=1, second input of muxs is selected. In other words, when Clk1 enable=0, the following signals are active: WData1, WAddress1, and Write Enable 1. However, when Clk1 enable=1, the following signals are active: WData2, WAddress2, and Write Enable 2.

The demux for RData and the mux for Raddress are controlled by Clk2 enable signal. When, Clk2 enable=0, first output of the demux and first input of the mux are selected. However, when Clk2 enable=1, second output of the demux and second input of the mux are selected. In other words, when Clk2 enable=0, the following signals are active: RData1 and RAddress1. However, when Clk2 enable=1, the following signals are active: RData2 and RAddress2.

Additionally, WAddress1 is appended with '0' as MSB and WAddress2 is appended with '1' as MSB bit. As a result, upper half of FPGA memory block 506 is allocated to target design memory block 502 and lower half of FPGA memory block 506 is allocated to target design memory block 504.

It will be apparent to a person skilled in the at that though the exemplary embodiment uses 2 port memory blocks of an FPGA, the invention is not limited to the same and encompasses other memory types including single port memory blocks and true dual port memory blocks.

Figure 6:
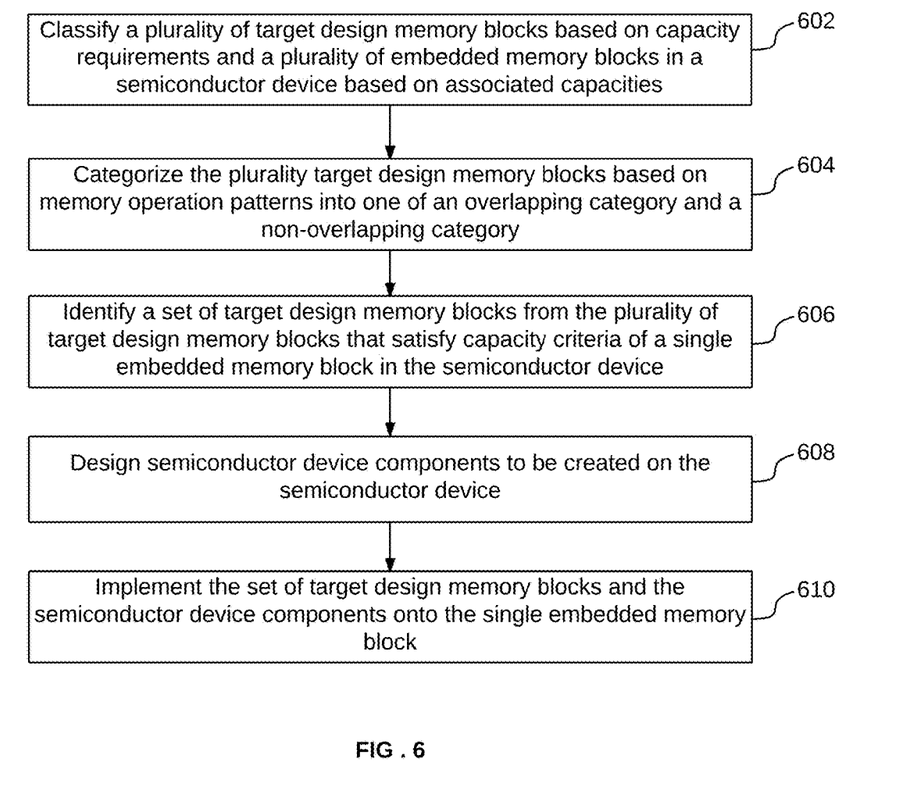
FIG. 6 illustrates a flowchart of a method for mapping target design memory blocks to embedded memory blocks in a semiconductor device of an embedded system, in accordance with another embodiment.

FIG. 6 illustrates a flowchart of a method for mapping target design memory blocks to embedded memory blocks in a semiconductor device of an embedded system, in accordance with another embodiment. At 602, a plurality of target design memory blocks are classified based on capacity requirements and a plurality of embedded memory blocks in a semiconductor device are classified based on associated capacities. Thereafter, at 604, the plurality target design memory blocks are categorized based on memory operation patterns into one of an overlapping category and a non-overlapping category. The memory operation patterns include write and read memory operations. This has been explained in detail in conjunction with FIG. 3.

At 606, a set of target design memory blocks are identified from the plurality of target design memory blocks that satisfy capacity criteria of a single embedded memory block in the semiconductor device. Thereafter, at 608, semiconductor device components to be created on the semiconductor device are designed. These semiconductor device components enable mapping of the set of target design memory blocks to the single embedded memory block. At 610, the set of target design memory blocks and the semiconductor device components are implemented onto the single embedded memory block. This has been explained in detail in conjunction with FIG. 3.

Figure 7:
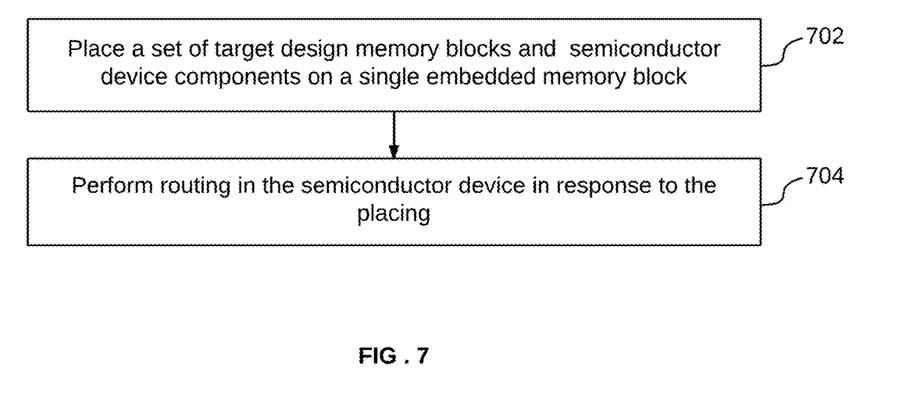
FIG. 7 illustrates a flowchart of a method for implementing a set of target design memory blocks to a single embedded memory block, in accordance with an embodiment.

FIG. 7 illustrates a flowchart of a method for implementing a set of target design memory blocks to a single embedded memory block, in accordance with an embodiment. At 702, a set of target design memory blocks and semiconductor device components are placed on a single embedded memory block.

Thereafter, in response to the placing, routing is performed, at 704, in the semiconductor device. The routing is performed such that it accommodates the placed set of target design memory blocks and the placed semiconductor device components. In other words, when routing is performed, it also takes into consideration the new or additional semiconductor device components that would be added to implement multiple target design memory blocks to a single embedded memory block. As a result of taking the new or additional semiconductor device components into consider, routing constraints may be reduced that might have occurred, had these additional components not been considered.

Figure 8:
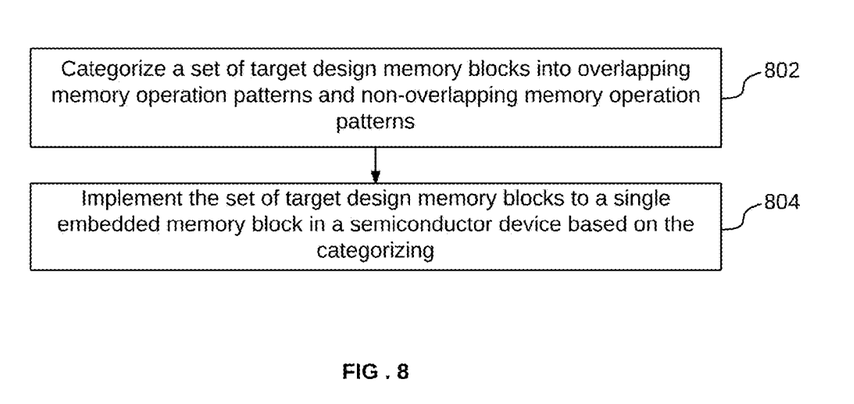
FIG. 8 illustrates a flowchart of a method for mapping overlapping target design memory blocks to an embedded memory block in a semiconductor device of an embedded system, in accordance with an embodiment.

FIG. 8 illustrates a flowchart of a method for mapping overlapping target design memory blocks to an embedded memory block in a semiconductor device of an embedded system, in accordance with an embodiment. At 802, a set of target design memory blocks are categorized into overlapping memory operations patterns and non-overlapping memory operation patterns. The identification may be performed by an EDA tool. The memory operations may include a write operation and a read operation. Thus, in other words, for each target design memory block in the set, the write/read accesses overlap. This has been explained in detail in conjunction with FIG. 3.

The set of target design memory blocks are identified such that the set satisfy the capacity criteria for the single embedded memory block. The capacity criteria of the single embedded memory block include two criteria. First: the combined width of memory blocks in the set of target design memory blocks is less than or equal to width of the single embedded memory block. Second: the combined depth of the memory blocks in the set of target design memory blocks is less than or equal to depth of the single embedded memory block. This has been explained in detail in conjunction with FIG. 3.

Thereafter, at 804, the set of target design memory blocks are implemented to a single embedded memory block in the semiconductor device based on the categorization. The method of implementing has been explained in detail in conjunction with FIGS. 3 and 7. In addition to implementing the set of target design memory blocks, semiconductor device components that are designed to enable the mapping are also implemented onto the single embedded memory block. This has been explained in detail in conjunction with FIG. 3 and the exemplary embodiment given in FIG. 5.

Various embodiments of the invention provide methods and systems for mapping target design memory blocks to embedded memory blocks in a semiconductor device of an embedded system. Multiple small target design memory blocks are implemented onto a single embedded memory block irrespective of the target design memory blocks having overlapping or non-overlapping memory access patterns. As a result, there is an optimal realization of target design memory blocks to minimal number of embedded memory blocks. This ensures that the number of embedded memory blocks needed in a semiconductor device is minimal for a specified number of target design memory blocks, thereby, minimizing the cost of the semiconductor device. This further leads to less routing congestion and improved timing performance as less number of embedded memory blocks are used in the semiconductor device.

The specification has described methods and systems for mapping target design memory blocks to embedded memory blocks in a semiconductor device of an embedded system. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of mapping target design memory blocks to embedded memory blocks in a semiconductor device of an embedded system, the method comprising:
   categorizing, via an Electronic Design Automation (EDA) tool, a plurality target design memory blocks based on memory operation patterns into one of an overlapping category or a non-overlapping category, the overlapping category comprising any of the target design memory blocks having overlapping memory operations and the non-overlapping category comprising any of the other target design memory blocks having non-overlapping memory operation, wherein each of the target design memory blocks in the overlapping category have the read and write operations occur at the same time instant or have same read/write control signals and each of the target memory blocks in the non-overlapping category have the read and write operations occur at different time instants or have different read/write control signals;
   identifying, via the EDA tool, a set of target design memory blocks from the plurality of target design memory blocks that satisfy capacity criteria of a single embedded memory block in the semiconductor device, wherein each target design memory block in the set is identified from the same category selected from one of the overlapping category and the non-overlapping category;
   designing, via the EDA tool, semiconductor device components to be created on the semiconductor device based on one of the overlapping category and the non-overlapping category, which the set of target design memory blocks is associated with; and
   implementing, via the EDA tool, the set of target design memory blocks and the semiconductor device components onto the single embedded memory block of the semiconductor device, wherein a number and placement of the semiconductor device components corresponds to one of the overlapping category or the non-overlapping category with which each of the target design memory blocks is associated,
   wherein the implementing comprises:
   placing the plurality of target design memory blocks and the semiconductor device components on the single embedded memory block.

2. The method of claim 1 further comprising:
   classifying the plurality of target design memory blocks based on capacity requirements, capacity requirement of a target design memory block comprising depth and width requirement of the target design memory block; and
   classifying a plurality of embedded memory blocks in the semiconductor device based on associated capacities, capacity of an embedded memory block comprising width and depth of the embedded memory block, the plurality of embedded memory blocks comprising the single embedded memory block.

3. The method of claim 2, wherein the set of target design memory blocks is identified in response to classifying the plurality of target design memory blocks and the plurality of embedded memory blocks in the semiconductor device.

4. The method of claim 1, wherein the capacity criteria of the single embedded memory block in the semiconductor device, comprise combined width of memory blocks in the set of target design memory blocks being less than or equal to width of the single embedded memory block in the semiconductor device and combined depth of the memory blocks in the set of target design memory blocks being less than or equal to depth of the single embedded memory block in the semiconductor device.

5. The method of claim 1, wherein the memory operations comprise read and write operations.

6. The method of claim 1, wherein the semiconductor device components are selected from a group comprising multiplexer, de-multiplexer, sequential elements, and combinatorial gates.

7. The method of claim 1, wherein the implementing further comprises:
   performing routing in the semiconductor device in response to the placing, wherein routing accommodates the placed set of target design memory blocks and the placed semiconductor device components.

8. The method of claim 1, wherein the semiconductor device comprises a Field Programmable Gate Array (FPGA), an Application Specific Integrated Circuit (ASIC), an Application Specific Standard Part (ASSP), a System on Chip (SoC), or a System on Programmable Chip (SoPC).

9. A method of mapping target design memory blocks to embedded memory blocks in a semiconductor device of an embedded system, the method comprising:
    categorizing, via an Electronic Design Automation (EDA) tool, a set of target design memory blocks into overlapping memory operation patterns or non-overlapping memory operations patterns, wherein each of the target design memory blocks in the overlapping category have the read and write operations occur at the same time instant or have same read/write control signals and each of the target memory blocks in the non-overlapping category have the read and write operations occur at different time instants or have different read/write control signals; and
    implementing, via the EDA tool, the set of target design memory blocks to a single embedded memory block of the semiconductor device based on the categorizing, wherein a number and placement of the semiconductor device components corresponds to one of the overlapping category or the non-overlapping category with which each of the target design memory blocks is associated,
    wherein the implementing comprises:
    placing the set of target design memory blocks and the semiconductor device components on the single embedded memory block.

10. The method of claim 9, wherein the memory operations comprise a read operation and a write operation.

11. The method of claim 9, wherein the embedded system comprises a Field Programmable Gate Array (FPGA), an Application Specific Integrated Circuit (ASIC), an Application Specific Standard Part (ASSP), a System on Chip (SoC), or a System on Programmable Chip (SoPC).

12. The method of claim 9, wherein the set of target design memory blocks satisfy the capacity criteria for the single embedded memory block.

13. The method of claim 12, wherein the capacity criteria of the single embedded memory block comprise combined width of memory blocks in the set of target design memory blocks being less than or equal to width of the single embedded memory block in the semiconductor device and combined depth of the memory blocks in the set of target design memory blocks being less than or equal to depth of the single embedded memory block in the semiconductor device.

14. The method of claim 9 further comprising designing embedded system components to be created on the embedded system to implement the set of design memory blocks to the single embedded memory block.

15. A system for mapping target design memory blocks to embedded memory blocks in a semiconductor device of an embedded system, the system comprising:
    at least one processor; and
    a computer-readable medium storing instructions that, when executed by the at least one processor, cause the at least one processor to perform operations comprising:
    categorizing a plurality target design memory blocks based on memory operation patterns into one of an overlapping category and a non-overlapping category, the overlapping category comprising any of the target design memory blocks having overlapping memory the non-overlapping category comprising any of the other target design memory blocks having non-overlapping memory operation, wherein each of the target design memory blocks in the overlapping category have the read and write operations occur at the same time instant or have same read/write control signals and each of the target memory blocks in the non-overlapping category have the read and write operations occur at different time instants or have different read/write control signals;
    identifying a set of target design memory blocks from the plurality of target design memory blocks that satisfy capacity criteria of a single embedded memory block in the semiconductor device, wherein each target design memory block in the set is identified from the same category selected from one of the overlapping category and the non-overlapping category;
    designing semiconductor device components to be created on the semiconductor device based on one of the overlapping category and the non-overlapping category, which the set of target design memory blocks is associated with; and
    implementing the set of target design memory blocks and the semiconductor device components onto the single embedded memory block of the semiconductor device, wherein a number and placement of the semiconductor device components corresponds to one of the overlapping category or the non-overlapping category with which each of the target design memory blocks is associated,
    wherein the implementing comprises:
    placing the set of target design memory blocks and the semiconductor device components on the single embedded memory block.

16. The system of claim 15, wherein the operations further comprise:
    classifying the plurality of target design memory blocks based on capacity requirements, capacity requirement of a target design memory block comprising depth and width requirement of the target design memory block; and
    classifying a plurality of embedded memory blocks in the semiconductor device based on associated capacities, capacity of an embedded memory block comprising width and depth of the embedded memory block, the plurality of embedded memory blocks comprising the single embedded memory block.

17. The system of claim 15, wherein the capacity criteria of the single embedded memory block in the semiconductor device, comprise combined width of memory blocks in the set of target design memory blocks being less than or equal to width of the single embedded memory block in the semiconductor device and combined depth of the memory blocks in the set of target design memory blocks being less than or equal to depth of the single embedded memory block in the semiconductor device.

18. The system of claim 15, wherein the operation of implementing further comprises operations of:
    performing routing in the semiconductor device in response to the placing, wherein routing accommodates the placed set of target design memory blocks and the placed semiconductor device components.

19. A non-transitory computer-readable storage medium for mapping target design memory blocks to embedded memory blocks in a semiconductor device of an embedded system, when executed by a computing device, cause the computing device to:
    categorize a plurality target design memory blocks based on memory operation patterns into one of an overlapping category or a non-overlapping category, the overlapping category comprising any of the target design memory blocks having overlapping memory operations or the non-overlapping category comprising any of the other target design memory blocks having non-overlapping memory operation, wherein each of the target design memory blocks in the overlapping category have the read and write operations occur at the same time instant or have same read/write control signals and each of the target memory blocks in the non-overlapping category have the read and write operations occur at different time instants or have different read/write control signals;

identify a set of target design memory blocks from the plurality of target design memory blocks that satisfy capacity criteria of a single embedded memory block in the semiconductor device, wherein each target design memory block in the set is identified from the same category selected from one of the overlapping category and the non-overlapping category;

design semiconductor device components to be created on the semiconductor device based on one of the overlapping category and the non-overlapping category, which the set of target design memory blocks is associated with; and implement the set of target design memory blocks and the semiconductor device components onto the single embedded memory block of the semiconductor device, wherein a number and placement of the semiconductor device components corresponds to one of the overlapping category or the non-overlapping category with which each of the target design memory blocks is associated, wherein the implementing comprises:

placing the set of target design memory blocks and the semiconductor device components on the single embedded memory block.

* * * * *